US012153019B2

(12) United States Patent
Lepage

(10) Patent No.: US 12,153,019 B2
(45) Date of Patent: Nov. 26, 2024

(54) ADAPTIVE TOTAL FOCUSING METHOD (TFM) SUCH AS FOR ZERO-DEGREE ACOUSTIC INSPECTION

(71) Applicant: Evident Scientific, Inc., Waltham, MA (US)

(72) Inventor: Benoit Lepage, L'Ancienne-Lorette (CA)

(73) Assignee: Evident Scientific, Inc., Waltham, MA (US)

( * ) Notice: Subject to any disclaimer, the term of this patent is extended or adjusted under 35 U.S.C. 154(b) by 170 days.

(21) Appl. No.: 17/657,292

(22) Filed: Mar. 30, 2022

(65) Prior Publication Data

US 2022/0317090 A1 Oct. 6, 2022

Related U.S. Application Data

(60) Provisional application No. 63/168,993, filed on Mar. 31, 2021.

(51) Int. Cl.
| | | |
|---|---|---|
| *G01N 29/06* | (2006.01) | |
| *G01N 29/07* | (2006.01) | |
| *G01N 29/24* | (2006.01) | |

(52) U.S. Cl.
CPC ......... *G01N 29/0645* (2013.01); *G01N 29/07* (2013.01); *G01N 29/2437* (2013.01); *G01N 2291/011* (2013.01); *G01N 2291/023* (2013.01); *G01N 2291/106* (2013.01)

(58) Field of Classification Search
CPC ............... G01N 29/0645; G01N 29/07; G01N 29/2437; G01N 2291/011; G01N 2291/023; G01N 2291/106; G01N 2291/044; G01N 29/11; G01N 29/262
See application file for complete search history.

(56) References Cited

U.S. PATENT DOCUMENTS

| 4,592,237 A | * | 6/1986 | Ogura ................... G01N 29/07 |
| | | | 73/609 |
| 6,397,681 B1 | * | 6/2002 | Mizunoya .......... G01N 29/0645 |
| | | | 73/620 |

OTHER PUBLICATIONS

"Video images for Inspect Complex Geometry with the Focus PX System and Coherent Adaptive Focusing Technology", youtube.com, [Online]. Retrieved from the Internet: <URL: https://www.youtube.com/watch?v=IkdkblmHT5Q&feature=youtu.be >, (Aug. 26, 2020), 14 pgs.

(Continued)

*Primary Examiner* — Tarun Sinha
(74) *Attorney, Agent, or Firm* — Schwegman Lundberg & Woessner, P.A.

(57) ABSTRACT

A full matrix capture (FMC) acoustic acquisition technique can be modified in a manner to compensate for one or more of variation from a nominal distance between an acoustic transducer array and the structure being scanned, or a variation from a nominal angle (e.g., inclination or declination) of the array surface with respect to the structure being scanned. Such modification can include determining incremental delay factors to be added or removed from nominal delay values in A-Scan data based on offset values corresponding to the transmit and receive transducer elements (or apertures) used for acquiring a particular A-Scan instance. The compensated A-Scan data in the FMC acquisition can then be used TFM imaging, for example.

20 Claims, 18 Drawing Sheets

(56) References Cited

OTHER PUBLICATIONS

Lamarre, Andre, et al., "Coherent Adaptive Focusing Technology for the Inspection of Variable Geometry Composite Material", 10th International Symposium on NDT in Aerospace, [Online]. Retrieved from the Internet: <URL: https://www.ndt.net/article/aero2018/papers/Th.5.C.4.pdf>, (2018), 16 pgs.

* cited by examiner

ADAPTIVE TOTAL FOCUSING METHOD (TFM) SUCH AS FOR ZERO-DEGREE ACOUSTIC INSPECTION

CLAIM OF PRIORITY

This patent application claims the benefit of priority of Benoit Lepage, U.S. Provisional Patent Application No. 63/168,993, titled "ADAPTIVE ZERO-DEGREE TOTAL FOCUSING METHOD," filed on Mar. 31, 2021, which is hereby incorporated by reference herein in its entirety.

FIELD OF THE DISCLOSURE

This document pertains generally, but not by way of limitation, to non-destructive evaluation using acoustic techniques, and more particularly to improved focusing techniques for phased-array ultrasound inspection.

BACKGROUND

Various techniques can be used to perform inspection of structures in a non-destructive manner. Such techniques can include use of ionizing radiation such as X-rays, electromagnetic techniques such as eddy-current techniques, or acoustic techniques, as illustrative examples. In one approach, an ultrasonic transducer or an array of such transducers can be used to inspect a structure using acoustic energy. Ultrasonic inspection is useful for inspection of a variety of different structures including bar-shaped or tubular structures, welds, planar (e.g., plate materials), and composite materials such as carbon-fiber reinforced composite structures. Inhomogeneities on or within the structure under test can generate scattered or reflected acoustic signals in response to a transmitted acoustic pulse. Such acoustic "echoes" can be received and processed. Such processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

SUMMARY OF THE DISCLOSURE

As mentioned above, acoustic techniques can be used to perform non-destructive testing (sometimes referred to generally as non-destructive evaluation) of structures by coupling acoustic energy onto or within such structures and detecting scattered or reflected energy corresponding to features on or within such structures under test.

In one approach, a plurality of acoustic transducers can be used to perform such acoustic inspection. Such a plurality of transducers can be referred to as an "array," but such an array need not be planar or linear in arrangement or orientation and need not have a constant pitch between respective transducer elements. Processing of received acoustic echo signals to form images can involve various techniques. In one approach, respective received acoustic echo signals can be "delayed and summed" to provide focusing within a specific locus on or within the structure under test. Such an approach can present challenges because the focal region is spatially limited in extent. In another approach, a technique called a "total focusing method" (TFM) can be used, such as involving a full-matrix capture (FMC) acquisition scheme where focus can be achieved across a broad spatial region on or within a structure under test. The techniques mentioned above can still present challenges.

For example, a couplant liquid, such as water, is generally used to between a surface of an acoustic transducer array and a structure being acoustically scanned. A distance or relative orientation (e.g., angle) between the acoustic transducer array and the structure being scanned can affect phased-array ultrasound test (PAUT) or TFM imaging operations. For example, TFM imaging may assume a fixed, specified distance (e.g., a nominal probe distance) between the acoustic transducer array and the structure being acoustically scanned in order to perform focusing computations based on transmit and receive propagation paths (including related nominal dimensions and acoustic propagation velocities). Where a nominal propagation path includes a beam oriented in a direction perpendicular (e.g., normal) to a nominal contour of a surface of a structure under test, a "zero-degree" TFM technique can be used to perform imaging. If there is variation in either a distance or angle of the acoustic transducer array with respect to the structure under test versus the nominally-assumed transducer array orientation, surface profile, or distance between the transducer array and surface of the structure being inspected, such a zero-degree TFM technique may show artifacts or present distorted data concerning feature locations.

To address challenges mentioned above, the present inventor has recognized, among other things, that an FMC acoustic acquisition can be modified in a manner to compensate for one or more of variation from a nominal distance between an acoustic transducer array and the structure being scanned, or a variation from a nominal angle (e.g., inclination or declination) of the array surface with respect to the structure being scanned. Such modification can include determining incremental delay factors to be added or removed from nominal delay values in A-Scan data based on offset values corresponding to the transmit and receive transducer elements (or apertures) used for acquiring a particular A-Scan instance. The compensated A-Scan data in the FMC acquisition can then be used TFM imaging, for example. Such modification can include determining incremental delay factors to be added or removed from time series that are being coherently summed. For example, the delay factors can be selected and applied based on the transmit and receive transducer elements (or apertures) used for particular terms in the TFM summation of FMC data, such as to apply a pair of delay factors for each transmit-receive pair in the FMC data. This can include either computing a new FMC matrix using the delay factors or applying the delay factors when summation is performed.

Application of determined transducer element delay factors does not otherwise require re-determination of time delays or phase values used for a beam forming matrix associated with performing the TFM imaging technique. The applied element delay factors can approximate a beam path corresponding to a pulse or echo having normal incidence to a surface of the structure being inspected (for zero-degree inspection). In this manner, computational complexity of performing TFM or other imaging is not made more burdensome because the delay factors are merely applied to the existing delayed A-scans that would be coherently summed for a pixel or voxel value determination. Resulting images can approach a quality of imaging obtained using a perfectly aligned probe, even if some misalignment is present during acquisition.

Such an "adaptive" technique can facilitate use of scanning approaches where a distance or angle of the array varies (or both vary) from a nominal relative position or orientation with respect to a surface of the structure under test, such as facilitating use of semi-automated or automated scanner configurations (e.g., HydroFORM™ available from Olympus Corporation). Use of the approach described herein can, for example, relax constraints on relative alignment or positioning accuracy of an acoustic transducer array used for inspection, because the approach described herein can compensate for a distance offset, an angular misalignment, or both, of an active surface of the acoustic transducer array relative to a surface of a structure under test, or for slight variations in the shape of the surface of the structure under test, if such a surface varies from a nominal (e.g., planar) shape.

In an example, a machine-implemented method for acoustic evaluation of a target can include generating respective acoustic transmission events using selected elements amongst a plurality of electroacoustic transducer elements and in response, receiving respective acoustic echo signals using other elements amongst the plurality of electroacoustic transducer elements, determining element delay factors for the selected elements, the delay factors corresponding to a deviation of a pulse-echo time of flight between a respective element and a nominal position of a surface of a structure being inspected, coherently summing representations of the respective received acoustic echo signals, the representations corresponding to respective transmit-receive pairs of elements of the plurality of electroacoustic transducers, the coherently summing including applying determined element delay factors to nominal delay values for summing the respective representations, to compensate for deviation of positions of corresponding transducer elements in the transmit-receive pairs relative to the surface of the structure being inspected, and generating a pixel or voxel value corresponding to a specified spatial location within the structure being inspected using the coherently summed representations. Multiple coherent summations can be performed, such as to compile an image using a TFM technique, as an illustrative example.

Optionally, the determination of element delay factors for selected elements of the plurality of electroacoustic transducers can include determining delay factors corresponding to respective elements at or near an edge of an array, and interpolating delay factors for other elements based on the determined delay factors corresponding to respective elements at or near the edge of the array. For example, determining the delay factors corresponding to the respective elements at or near the edge of the array can include coherently summing representations of the received acoustic echo signals to approximate a beam normal to a nominal shape of the surface of the structure being inspected, the beam formed using a plurality of transducers at or near the edge of the array. Such an example is merely illustrative and other approaches can be used to establish the delay factors.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4A shows offset compensation for a distance variation, and a FIG. 4B shows offset compensation for an inclination angle variation.

DETAILED DESCRIPTION

Figure 1:
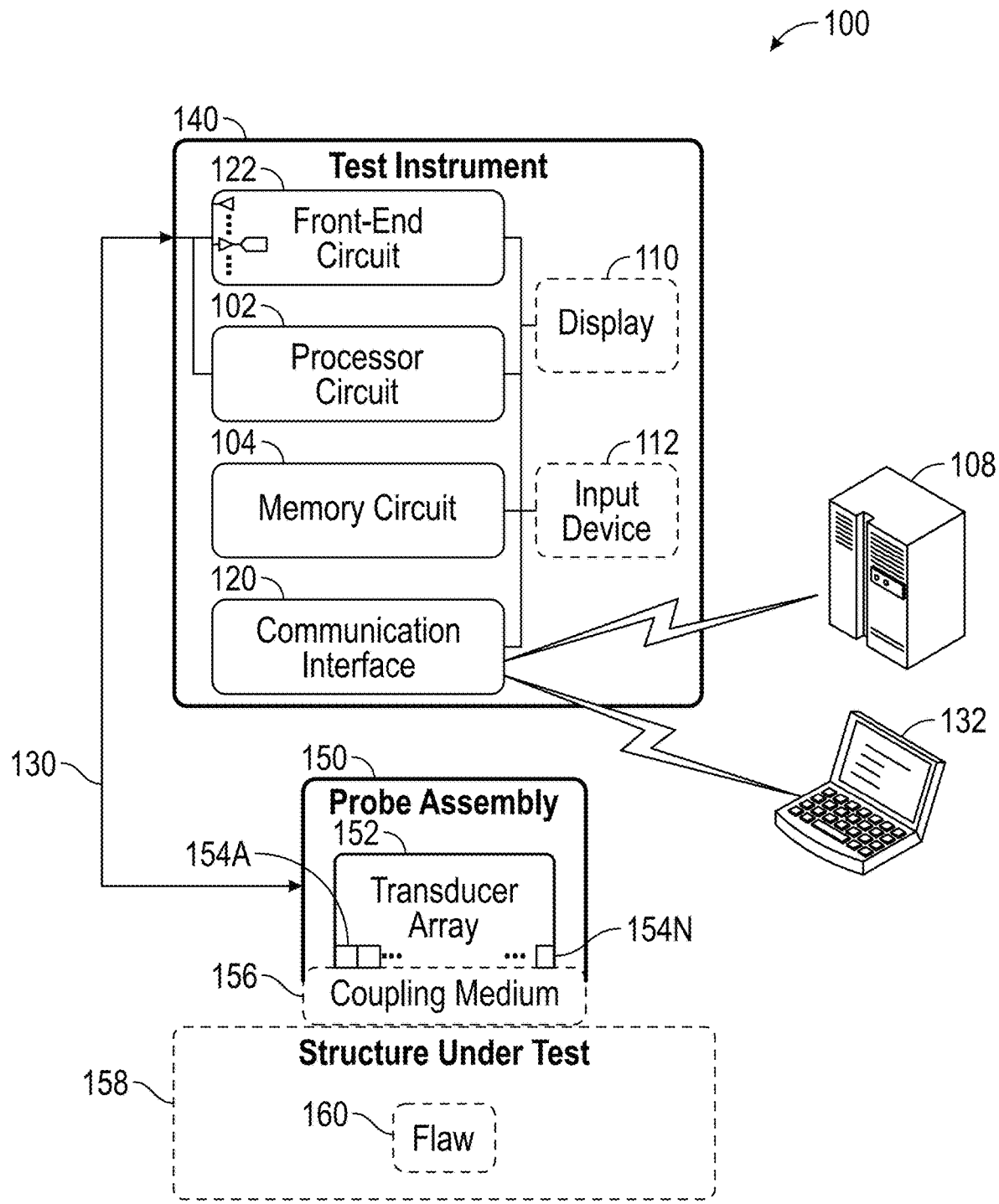
FIG. 1 illustrates generally an example comprising an acoustic inspection system, such as can be used to perform one or more techniques showed and described elsewhere herein.

As discussed generally above, the techniques described herein can be used to facilitate non-destructive acoustic inspection of a structure, such as a structure under test partially or completed submerged in a couplant medium. Generally, for phased-array ultrasound testing or Total Focusing Method (TFM) based imaging, focusing can be achieved using a beamforming technique, such as by processing received acoustic echo signals and applying delay values (or equivalent phase rotation). TFM imaging generally assumes a known structural configuration and constitutive parameters such as acoustic propagation velocity for the modes being excited by the acoustic system. Such structural configuration can include transducer element location, size, distance to structure under test, propagation velocity within coupling medium and structure under test, and the like. In practice, the distance between an acoustic transducer array and the structure under test may vary, as can the angle of the transducer array relative to a surface of the structure under test.

As discussed below, misalignment or variation in the position of the acoustic transducer array relative to the structure being inspected can impact a quality of resulting imaging or other processing. In one approach, dimensional control of the inspection setup can be made more stringent to reduce errors induced by such variation. However, a positioning accuracy, in the absence of compensation techniques described herein, may require sub-millimeter repeatability or angular alignment repeatability of a fraction of a degree or less. Such constraints may result in more expensive test fixturing or otherwise reduced measurement reliability or productivity. Accordingly, the present inventor has recognized that the compensation techniques described herein can improve imaging reliability (e.g., an ability to distinguish features of interest from artifacts and with accurate spatial localization), or imaging productivity (e.g., allowing less time spent on alignment, or otherwise facilitating faster acquisition and processing). Generally, an aspect of the present subject matter can include application of determined transducer element delay factors without otherwise requiring re-determination of time delays or phase values used for a beam forming matrix associated with performing TFM imaging. For example, nominal beamforming parameters can be used initially for FMC acquisition and TFM imaging. In the nominal case, a beam path is established corresponding to a pulse or echo having normal incidence to a surface of the structure being inspected. The further application of adjusted element delay factors can help to approximate such normal incidence when a transducer array orientation or position is off-nominal, or when slight variations exist with respect to a surface geometry of the structure under test. In this approach, computational complexity of performing TFM or other imaging is not made more burdensome. Resulting images can approach a quality of imaging obtained using a perfectly aligned probe and nominal surface contour of the structure under test, even if some misalignment is present during acquisition.

FIG. 1 illustrates generally an example comprising an acoustic inspection system 100, such as can be used to perform one or more techniques showed and described elsewhere herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various different probe assemblies 150. Generally, the transducer array 152 includes piezoelectric transducers, such as can be acoustically coupled to a target 158 (e.g., a structure under test) through a coupling medium 156 (e.g., a water column). The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing or the transducer array 152 and the target 158 can be partially or completely immersed in the couplant medium 156 to provide a couplant column between the transducer array 152 active surface and a surface of the target 158.

The test instrument 140 can include digital and analog circuitry, such as a front end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150. Similarly, a test protocol can be performed using coordination between multiple test instruments 140, such as in response to an overall test scheme established from a master test instrument 140 or established by another remote system such as a compute facility 108 or general-purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as matrices of A-scan time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

In the examples in this document, data is generally acquired using a full-matrix capture (FMC) technique. Generally, in an FMC approach, acoustic transmission events occur where each element in a transducer array generates an acoustic pulse while the other elements in array receive echo signals (reflections or scattered acoustic energy) elicited in response to the acoustic transmission. An FMC matrix is defined first in two axes where a first axes corresponds to each transmit event, and a second axis corresponds to each receiving location. Each element in the FMC matrix comprises time-series data (e.g., an elementary "A-Scan") corresponding to a particular receiving location and a corresponding transmit event (e.g., a transmit-receive pair of transducers). Generally, each element in the FMC matrix has a one-to-one relationship with electroacoustic transducer elements in the transducer array, but such a one-to-one relationship is not required. In another approach, groups of elements can be used for transmission during individual transmission events and groups of elements can be used for receiving during the receive events, such as to provide desired transmission or receive apertures or transmit-receive combinations.

To construct an image of a particular location (e.g., a pixel or voxel location in the imaging data), generally, contributions from signals received at each transducer element in response to each transmission event are summed, including selecting appropriate samples from the corresponding A-Scans corresponding to the spatial location (and related propagation path) of the pixel or voxel. The A-Scan data can include real-valued time-series information or analytic form. Because the propagation path influences that summation for each voxel or pixel, filtering or modulation of signals can be performed in response to one or more characteristics of the propagation path, such as by weighting particular terms in the summation using knowledge of the propagation path. As mentioned above, variation between the modeled propagation path and the actual path traversed during acquisition can produce imaging artifacts. Generally, a nominal beamforming model is established based on a known surface geometry of the structure being inspected, a nominal couplant column height, and a nominal transducer array orientation.

Figure 2A:
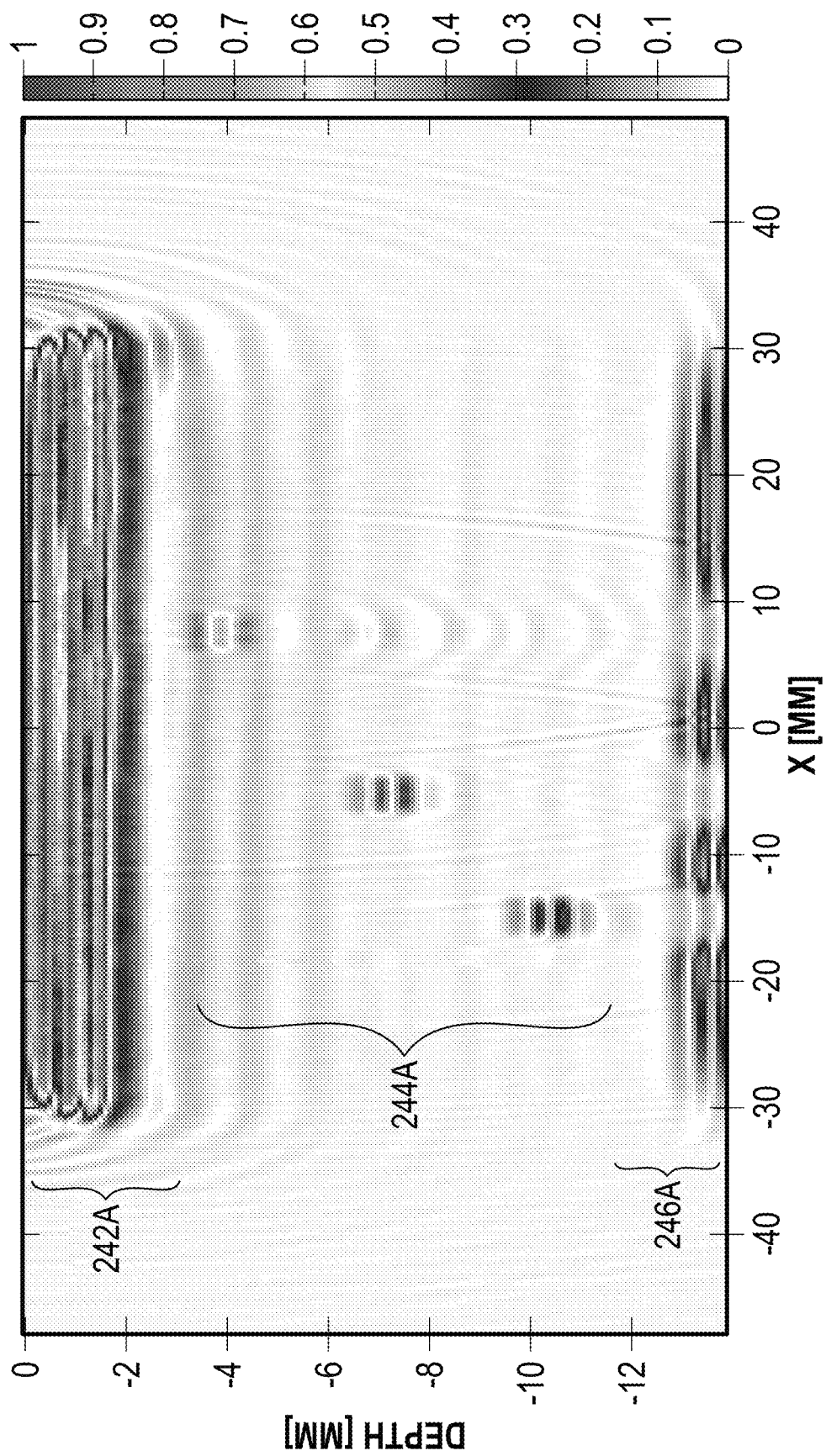
FIG. 2A shows an illustrative example of TFM imaging performed using an offset-adjusted couplant column thickness located between a structure under test and an acoustic transducer array.
Figure 2B:
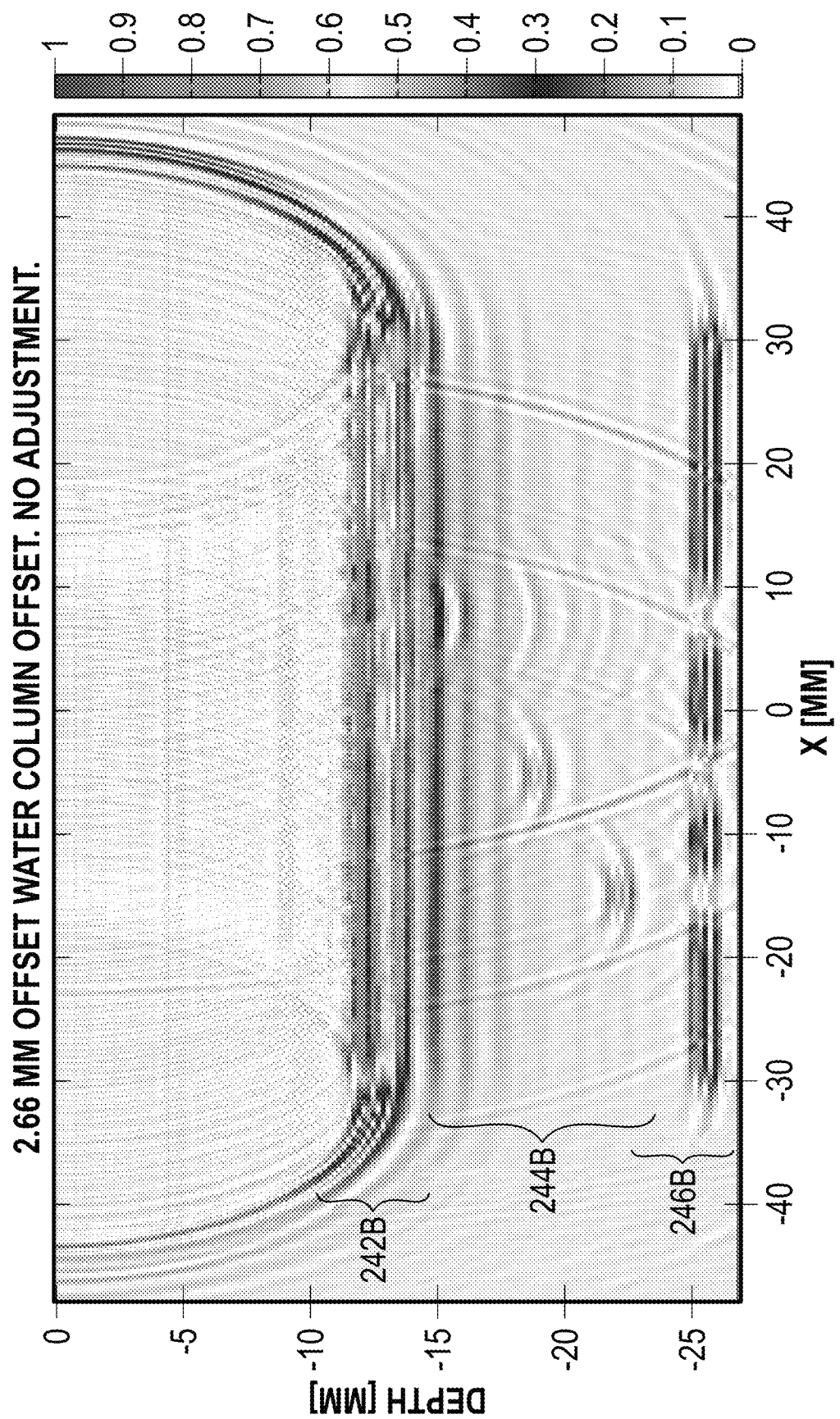
FIG. 2B shows an illustrative example of TFM imaging performed when an uncompensated 2.66 millimeter offset from a nominal couplant column thickness is present.

For example, FIG. 2A shows an illustrative example of TFM imaging performed using an offset-adjusted couplant column (e.g., water column) thickness located between a structure under test and an acoustic transducer array, and FIG. 2B shows an illustrative example of TFM imaging performed when an uncompensated 2.66 millimeter offset from a nominal couplant column thickness is present. FIG. 2A corresponds to an image that would be acquired if there were no angle or distance variation from a nominal probe angle (e.g., zero-degree inclination with respect to a planar surface of a structure under test), and a known distance between the probe and the structure under test. A prominent front wall echo 242A is imaged, along with features 244A (such as representative of flaws in the structure under test), and a rear wall echo 246A. By contrast, as shown in FIG. 2B, locations such as a front wall echo 242B (e.g., a surface echo) and a rear wall echo 246B have moved in the depth axis of the image, and features 244B ("indications"), such as flaw locations, are distorted and are represented as occurring at different depths in FIG. 2B than in the representation shown in FIG. 2A. Accordingly, even though the same transducer assembly and structure under test were used in both FIG. 2A and FIG. 2B, the imaging in FIG. 2B appears to present different depth locations and a distorted view of the features 244B. In particular, FIG. 2B shows that a relatively small change in distance (e.g., water column height) of less than 3 mm is sufficient to significantly alter resulting TFM imaging performed on acquired FMC data.

Figure 3A:
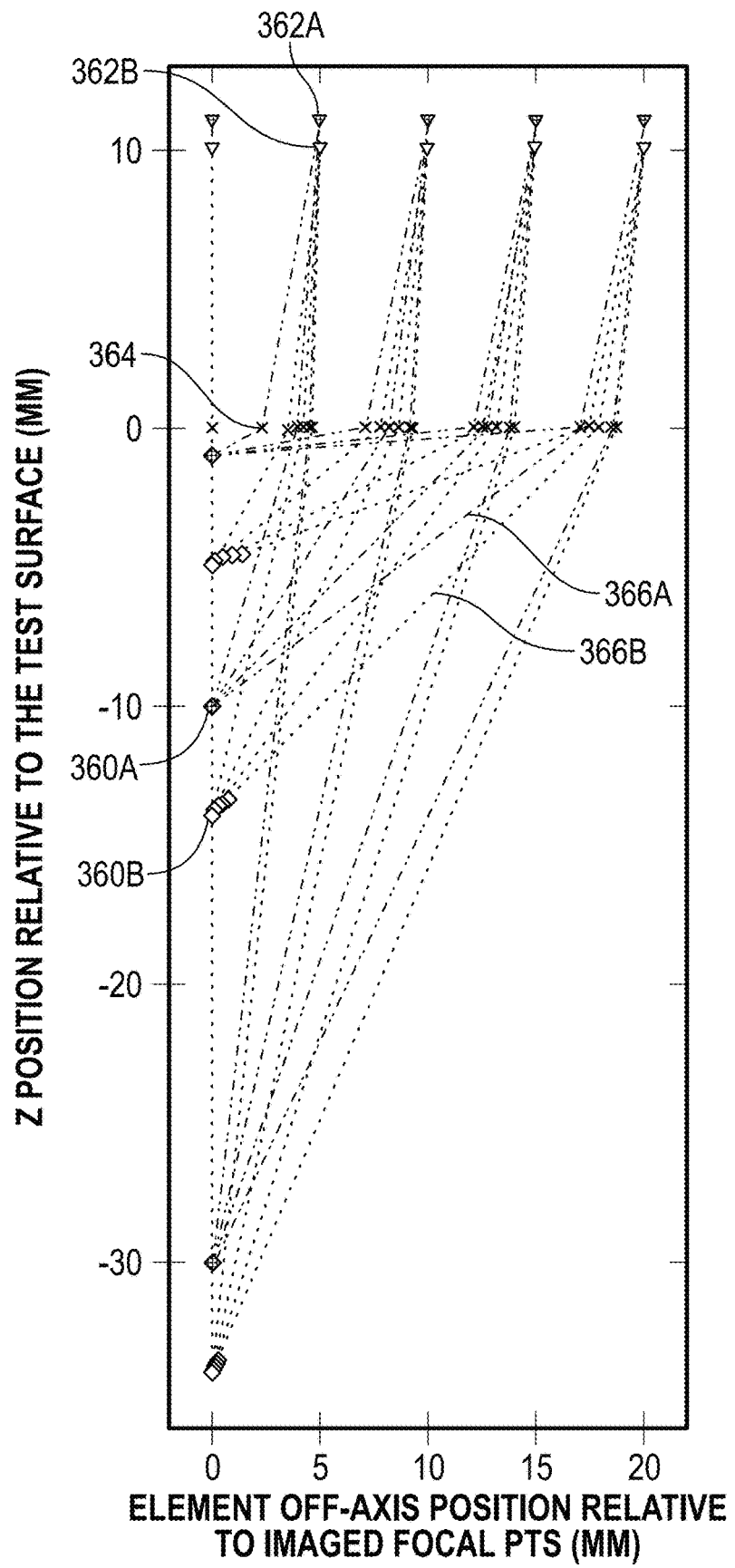
FIG. 3A and FIG. 3B show illustrative examples of ray representations of acoustic beams showing a difference between a ray and a focal location as established by the TFM technique assuming a nominal setup (e.g., a beamforming model), and the actual spatial location of the ray when an offset is present, with FIG. 3A showing an error caused by a distance offset, and the FIG. 3B showing an error caused by an inclination angle offset.
Figure 3B:
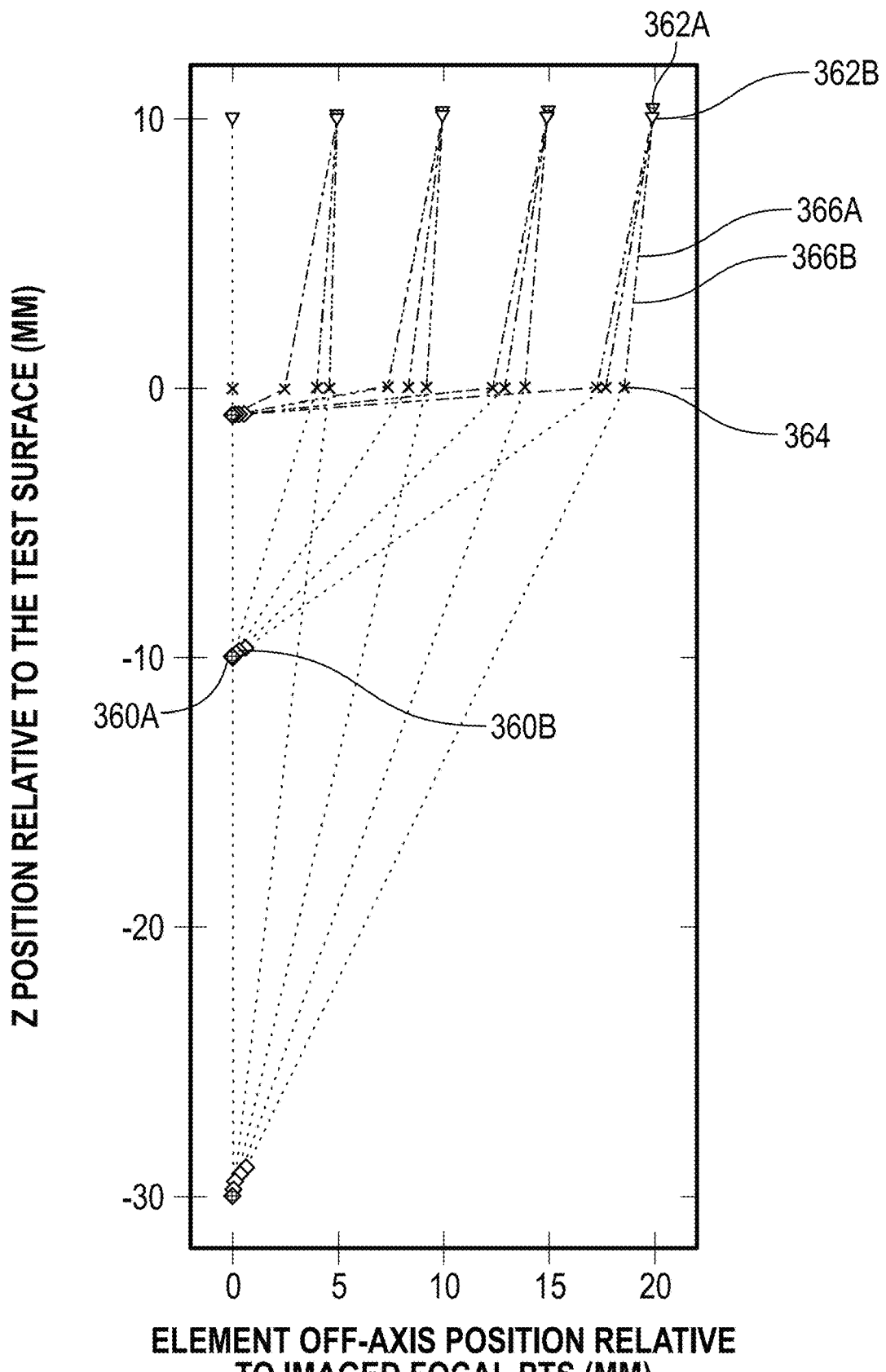

FIG. 3A and FIG. 3B show illustrative examples of ray representations of acoustic beams showing a difference between a ray 366B and a focal location 360B as established by the TFM technique assuming a nominal setup (e.g., a beamforming model), and the actual spatial location of the ray 366A and focal location 360A when an offset is present in the physical test setup during acquisition, with FIG. 3A showing an error caused by a distance offset (e.g., a +1 mm offset versus nominal), and the FIG. 3B showing an error caused by an inclination angle offset (e.g., a +1 degree inclination versus a zero-degree nominal orientation). In both FIG. 3A and FIG. 3B, a modeled element location 362B is offset from the actual element location 362A. Accordingly, in a TFM image, a flaw at the focal location 360A will appear to have an incorrect depth and spatial position in a resulting image, corresponding to the computed focal location 360B.

Figure 4A:
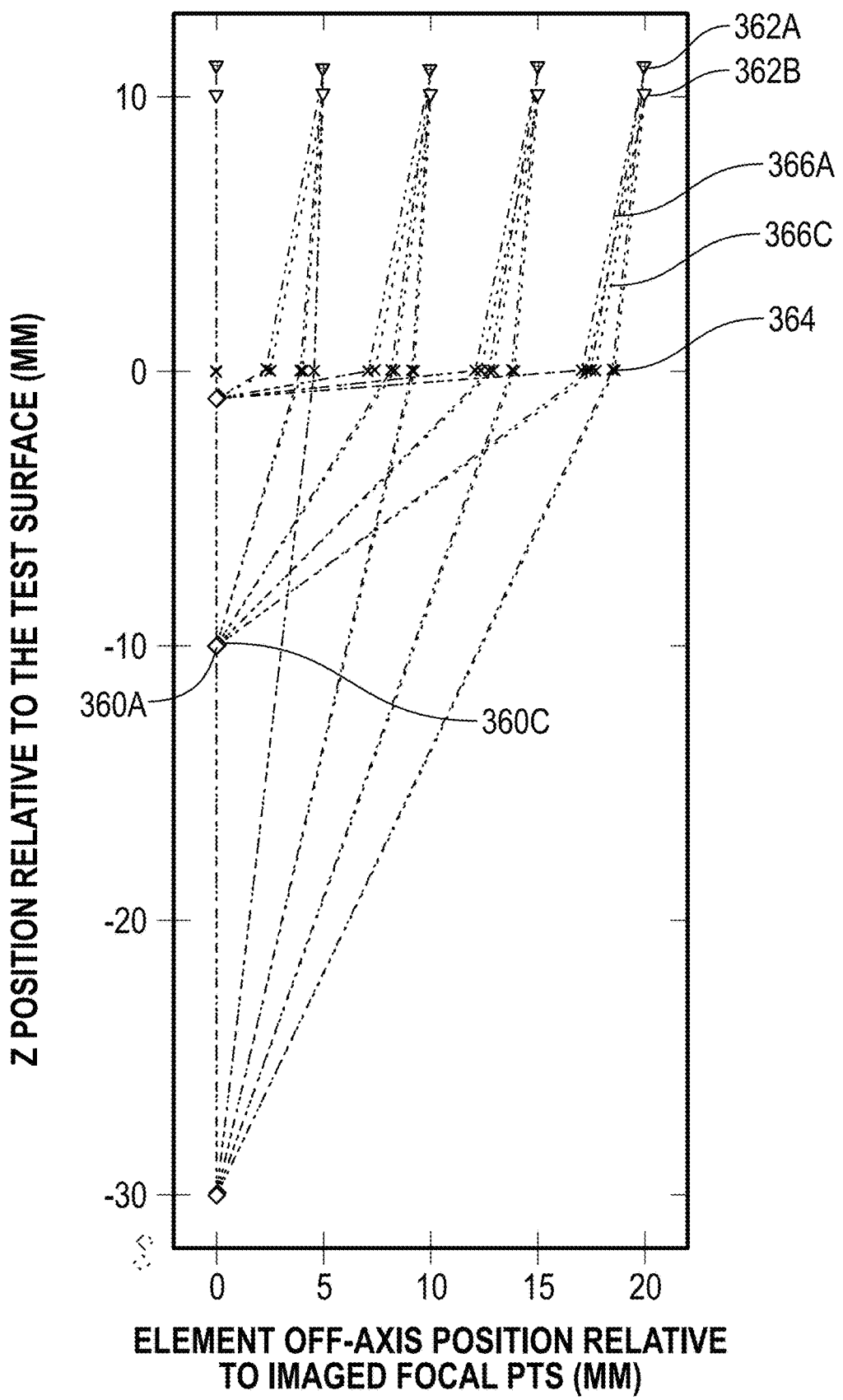
FIG. 4A and FIG. 4B show illustrative examples of ray representations of acoustic beams showing that the difference between a ray and a focal location as established by the TFM technique when offset compensation is performed, and the actual spatial location of the ray, where
Figure 4B:
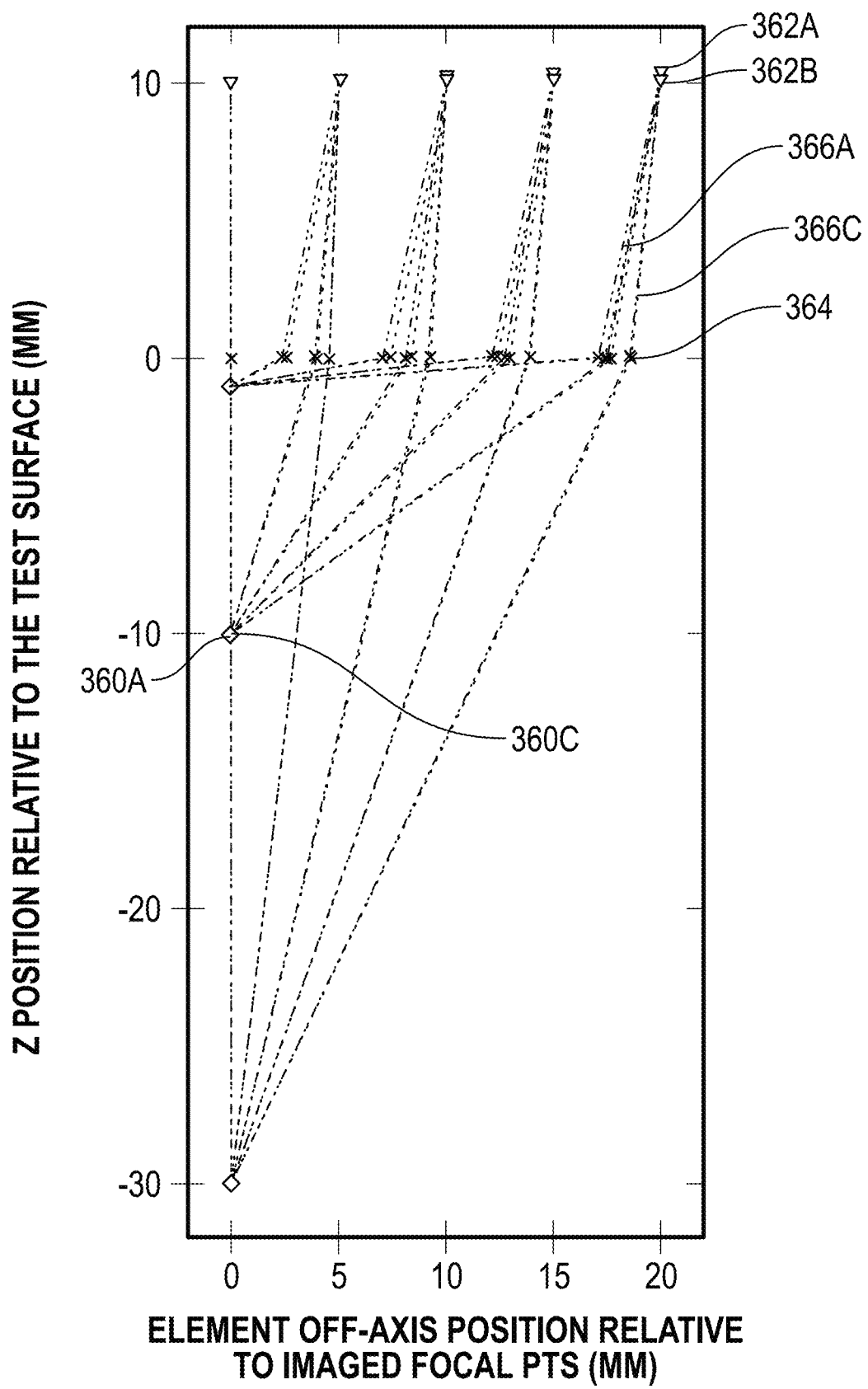

The techniques shown and described herein can compensate for a distance difference or inclination angle difference in a beam path between a surface (e.g., interface 364) of a structure under test, and the transducer element locations (such as an off-axis transducer element location 362A). For example, FIG. 4A and FIG. 4B show illustrative examples of ray representations of acoustic beams showing that the difference between a ray 366C from a nominal element 362B location, and a focal location 360C, as established by the TFM technique when offset compensation is performed, and the actual spatial location of the ray 366A from element 362A and focal location 360A, where FIG. 4A shows offset compensation caused by a distance offset (e.g., a +1 mm offset versus nominal), and a FIG. 4B shows offset compensation for an inclination angle variation caused by an inclination angle offset (e.g., a +1 degree inclination versus a zero-degree nominal orientation). Because the rays 366A and 366C are nearly vertical (e.g., normally incident from or to the interface 364, offset compensation can be performed by adjusting a delay or phase of individual A-scans acquired by respective elements such as the element 362A. In this manner, two delay factors such as a time delay or phase rotation can be applied based on the respective transmit-receive pair of transducers without requiring re-computation of an FMC beamforming matrix used for TFM imaging. By applying the delay factors (through time-delaying the A-scan representations or phase-rotation), existing (e.g., nominal) assumptions of propagation paths used in generating the TFM summations for respective pixels or voxels can be preserved, enhancing computational efficiency.

Figure 5:
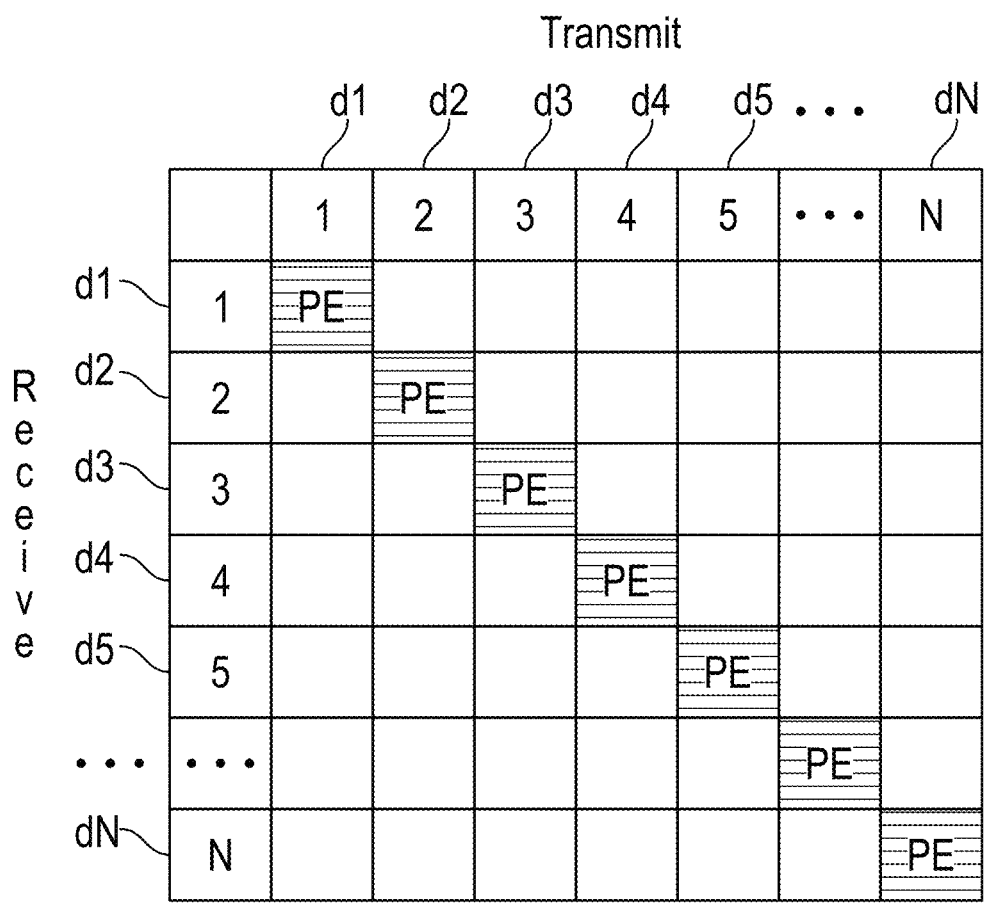
FIG. 5 illustrates generally an approach where delay factors can be determined such as for distance or angular offset compensation, where the delay factors can be determined on an element-by-element (or aperture-by-aperture) basis and applied for transmit beamforming, receive beamforming, or both.

FIG. 5 illustrates generally an approach where delay factors can be determined such as for distance or angular offset compensation, where the delay factors can be determined on an element-by-element (or aperture-by-aperture) basis and applied either through establishing an updated FMC beamforming matrix, or during coherent summation such as during TFM imaging. As mentioned above, because acoustic beam propagation in a coupling medium such as water will be roughly perpendicular (e.g., normal) to the structure under test, it is possible to adapt to distance or angle changes (or both) by including a corresponding time offset (or phase rotation) during coherent summation for imaging. Such adjustments can be referred to as delay factors and can be established independently of any nominal beamforming used for computing the FMC matrix or TFM summation. Such an approach can be highly efficient from a computational perspective because knowledge of the actual beam path due to the distance or angle variation is not required, and the existing beam or propagation path modeling can be used in combination with the applied delay offsets, which compensate for delay error in the original beamforming computation associated with slight variation in the propagation path between the transmit and receive transducer and a surface of the structure under test.

For example, referring to FIG. 5, determination of delay factors need not consider a unique delay value for the oblique propagation path associated with each transmit-receive pair. Instead, such as for a linear array of N transducers, N delay values $d_1$ through $d_N$ can be determined. Various approaches can be used for determining the delay values $d_1$ through $d_N$. For example, a pulse-echo (e.g., time-of-flight) approach can be used by transmitting pulses from each element in the array sequentially. As shown in FIG. 5, using an illustrative example of a linear array having N elements, each element can produce a transmit pulse and a corresponding surface echo (e.g., a front wall echo) can be received by the same transducer as produced the transmit pulse. A resulting delay factor can be stored (e.g., a delay value corresponding to the propagation delay of an acoustic pulse between a transducer surface and a surface of the structure being tested). Such an approach be inefficient.

Another approach for determining delay factors can include performing an FMC acquisition assuming a nominal geometry (e.g., a nominal transducer array orientation and distance relative to the structure under test). A spatially limited TFM imaging operation could be performed to generate pixel or voxel data in order to gauge an updated front wall location with respect to each specified transducer location, and a corresponding distance determination can be converted to a delay value to be applied in a subsequent full TFM imaging operation. In another approach, acquired FMC data can be used to synthesize a beam using transmit-receive data from a selected few transducer elements at or near an edge of the array, the beam normal to a nominal surface geometry. A coherent summation can be performed in a manner similar to phased array ultrasound testing (PAUT) using such a reduced data set. Either the spatially limited TFM or synthetic PAUT approaches can be performed at edges corresponding to opposite ends of the array, such as to establish delay factors for transducers at the edge of the array, and remaining delay factors for intervening elements can be established using interpolation. In this manner, for a linear or planar transducer array, a delay factor for each element need not be directly measured. The spatially limited TFM or synthetic PAUT approaches do not require a separate acquisition of FMC data for establishing the delay factors, allowing re-use of an existing FMC acquisition for both establishing delay factors, and performing offset adjusted bulk TFM imaging within the structure under test using the established delay factors.

Generally, to construct an image of a particular location within the structure under test (e.g., a pixel or voxel location in the imaging data), contributions from signals received at each transducer element in response to each imaging transmit-receive event can be coherently summed, including selecting appropriate samples from the corresponding A-scans corresponding to the spatial location (and related propagation path) of the pixel or voxel. The A-scan data can include real-valued time-series information or analytic form. The determined delay factors can be applied to A-Scan time-series data before summation (or stored in an updated FMC matrix having the applied delay factors), so that variation of couplant column height from nominal is compensated for in relation to each element. For example, the delay factors are selected and applied based on the corresponding transmit and receive elements used for a respective FMC matrix element. As an illustration, if a particular FMC element corresponds to an A-scan acquired using element "3" as the transmitting element and element "5" as the receiving element, the delay factors $d_3$ and $d_5$ will be applied (e.g., if $d_3$ and $d_5$ are both delay duration offsets from nominal, the applied value will be the sum of values $d_3$ and $d_5$, or a corresponding aggregated amount of phase rotation).

Figure 6A:
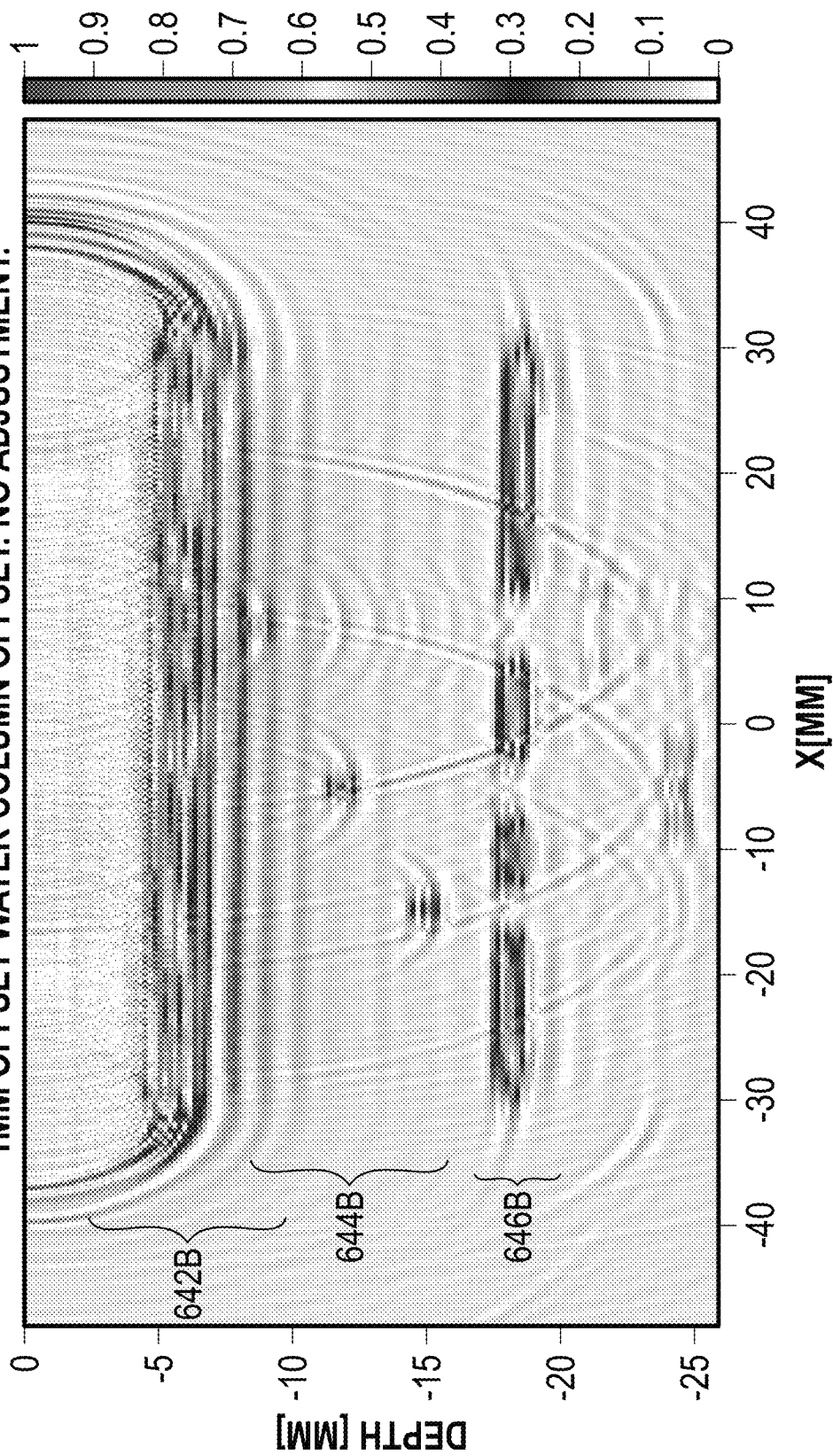
FIG. 6A shows an illustrative example of TFM imaging performed when an uncompensated 1 millimeter offset from a nominal couplant column thickness is present.

FIG. 6A shows an illustrative example of TFM imaging performed when an uncompensated 1 millimeter offset from a nominal couplant column thickness is present. As discussed in another illustrative example above, a front-wall echo 642B is present, but distorted and the corresponding depth indicated by TFM imaging is inaccurate. Features 644B are distorted in both locus and depth, as is the rear wall echo 646B.

Figure 6B:
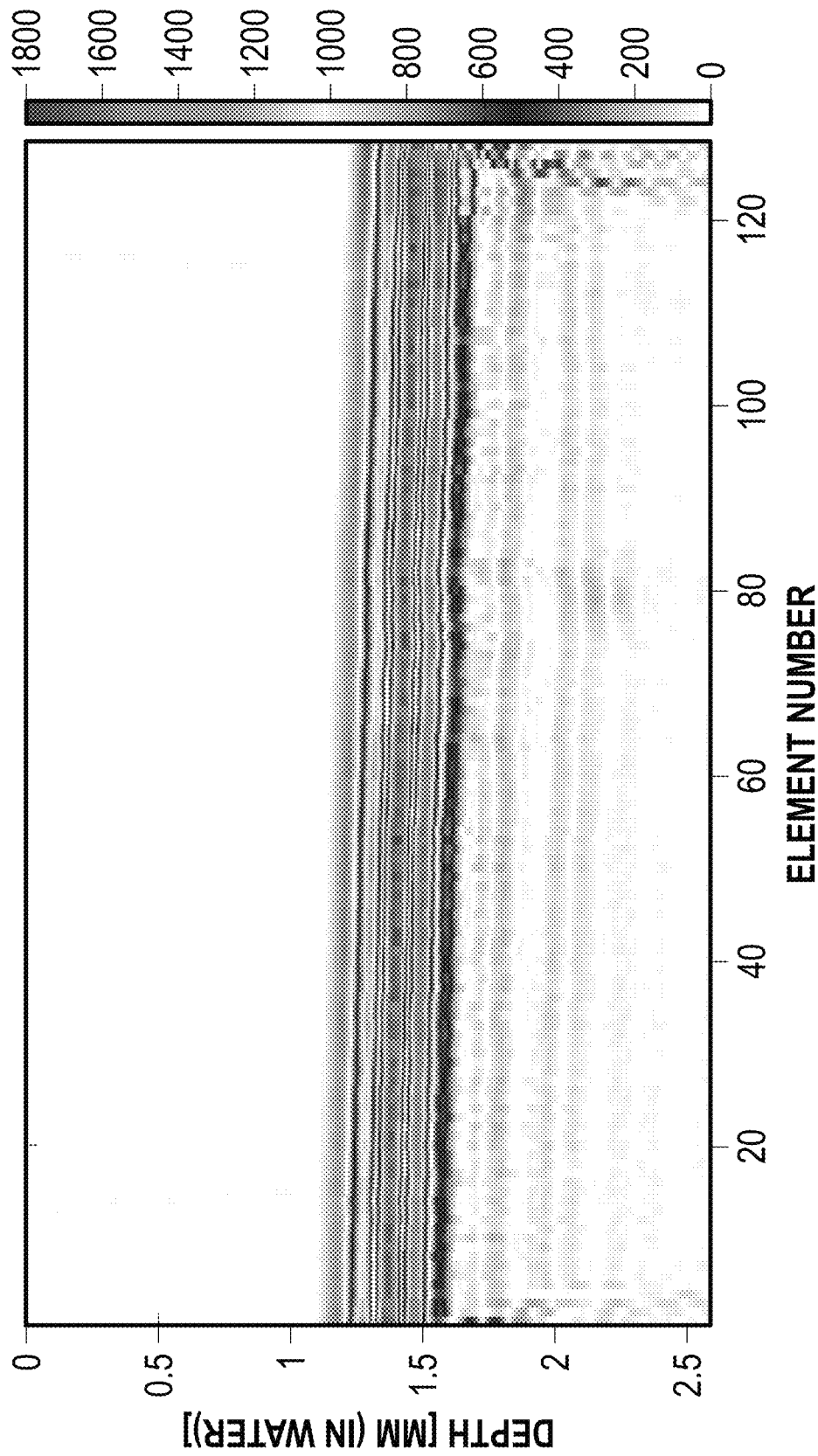
FIG. 6B shows an illustrative example of pulse-echo imaging of a surface profile (e.g., a front wall echo) for same setup as the TFM imaging of FIG. 6A.
Figure 6C:
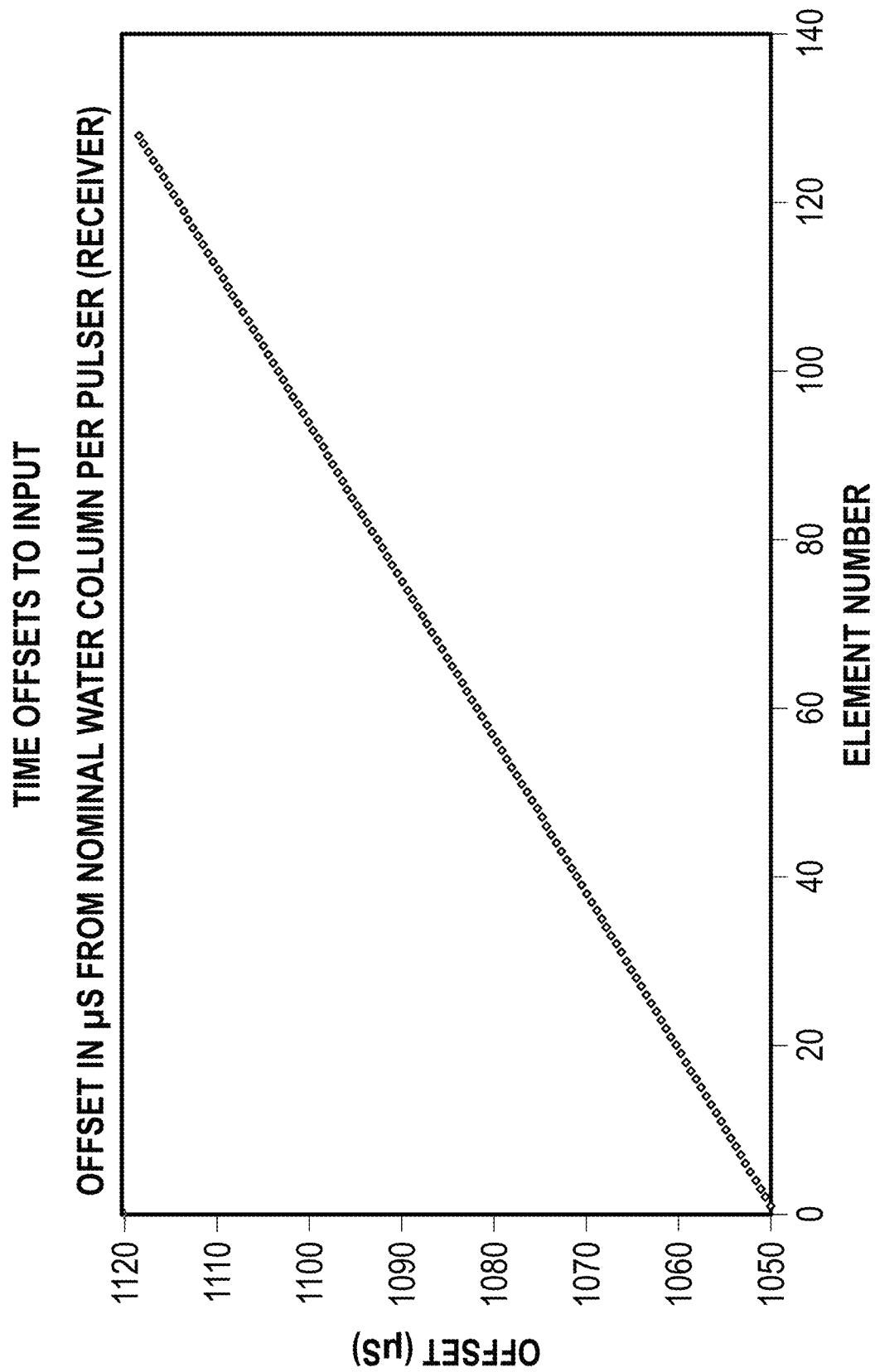
FIG. 6C shows an illustrative example of determined delay factors, such as established using the pulse-echo imaging acquisition shown in FIG. 6B, and such as can be used to perform compensation for 1 mm offset deviation from a nominal couplant column thickness.

FIG. 6B shows an illustrative example of pulse-echo imaging of a surface profile (e.g., a front wall echo) for same setup as the TFM imaging of FIG. 6A. The pulse-echo approach shows that the approximately 1 mm offset can be gauged using acoustic pulses, and corresponding delay factors can be established as shown and described in other examples herein. For example, FIG. 6C shows an illustrative example of determined delay factors, such as established using the pulse-echo imaging acquisition shown in FIG. 6B, and such as can be used to perform compensation for 1 mm offset deviation from a nominal couplant column thickness. A delay value can be determined for each element in an array, and in the illustration of FIG. 6C, there are 128 delay values corresponding to a 128-element linear array used for zero-degree TFM imaging.

Figure 6D:
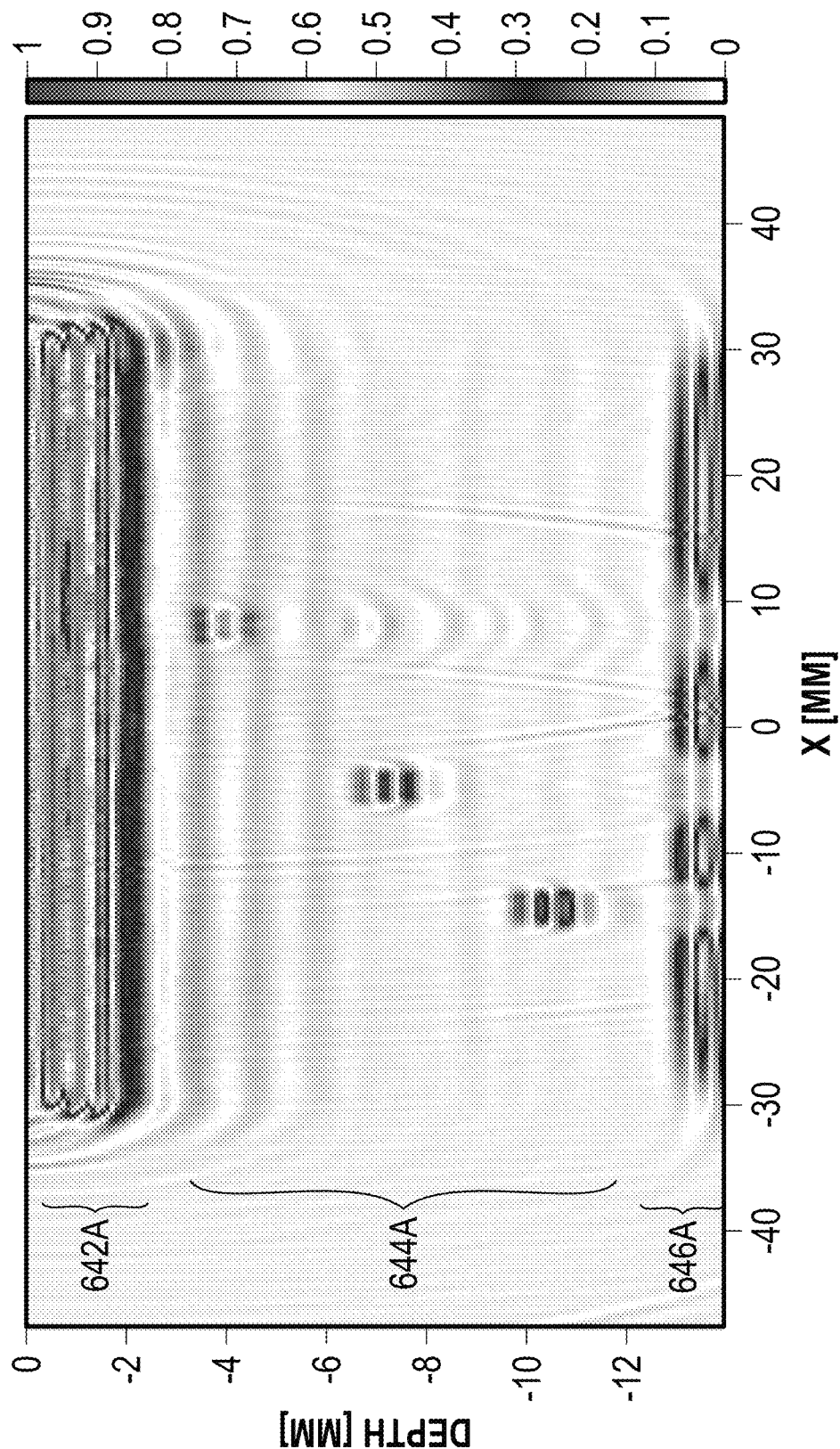
FIG. 6D shows an illustrative example of TFM imaging using an offset-adjusted couplant column thickness, the offset adjustment performed using the determined delay factors of FIG. 6C.

FIG. 6D shows an illustrative example of TFM imaging using an offset-adjusted couplant column thickness, the offset adjustment performed using the determined delay factors of FIG. 6C (where corresponding delay factors are applied based on the transmit and receive transducers used for each FMC A-scan). The front wall echo 642A and rear wall echo 646A are now imaged more distinctly and appear at the appropriate depth in relation to the physical dimensions of the structure under test, and the features 644A are rendered more distinctly and with greater depth accuracy than the un-adjusted example of FIG. 6A.

Figure 7A:
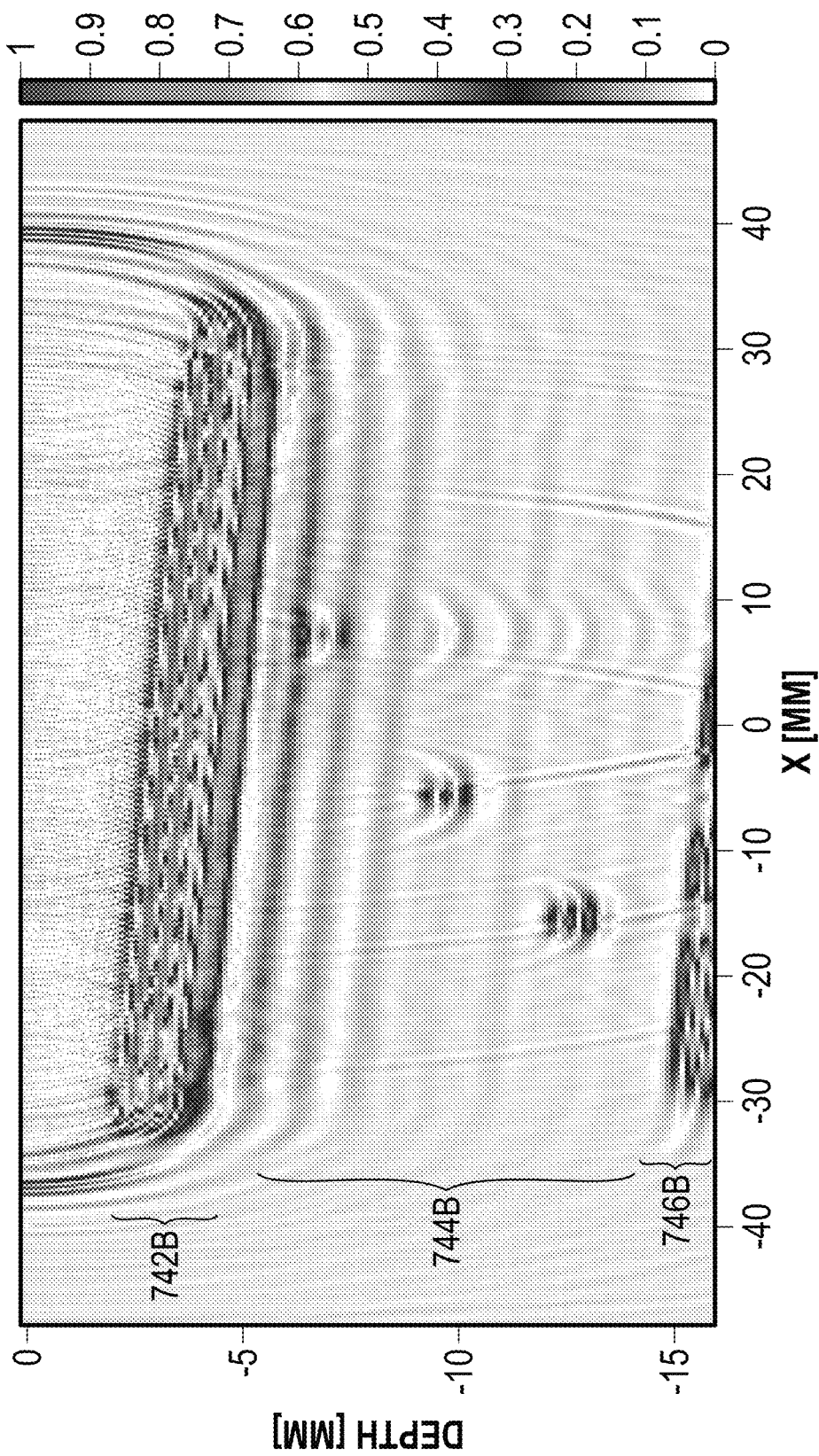
FIG. 7A shows an illustrative example of TFM imaging performed when an uncompensated angular offset (e.g., tilt) from a nominal zero-degree orientation of the transducer array.

FIG. 7A shows an illustrative example of TFM imaging performed when an uncompensated angular offset (e.g., tilt) from a nominal zero-degree orientation of the transducer array. Similar to the example of FIG. 6A, but with a tilt of the transducer array, FIG. 7A shows distortion in locations of the front wall echo 742B, rear wall echo 746B and features 744B within the structure under test.

Figure 7B:
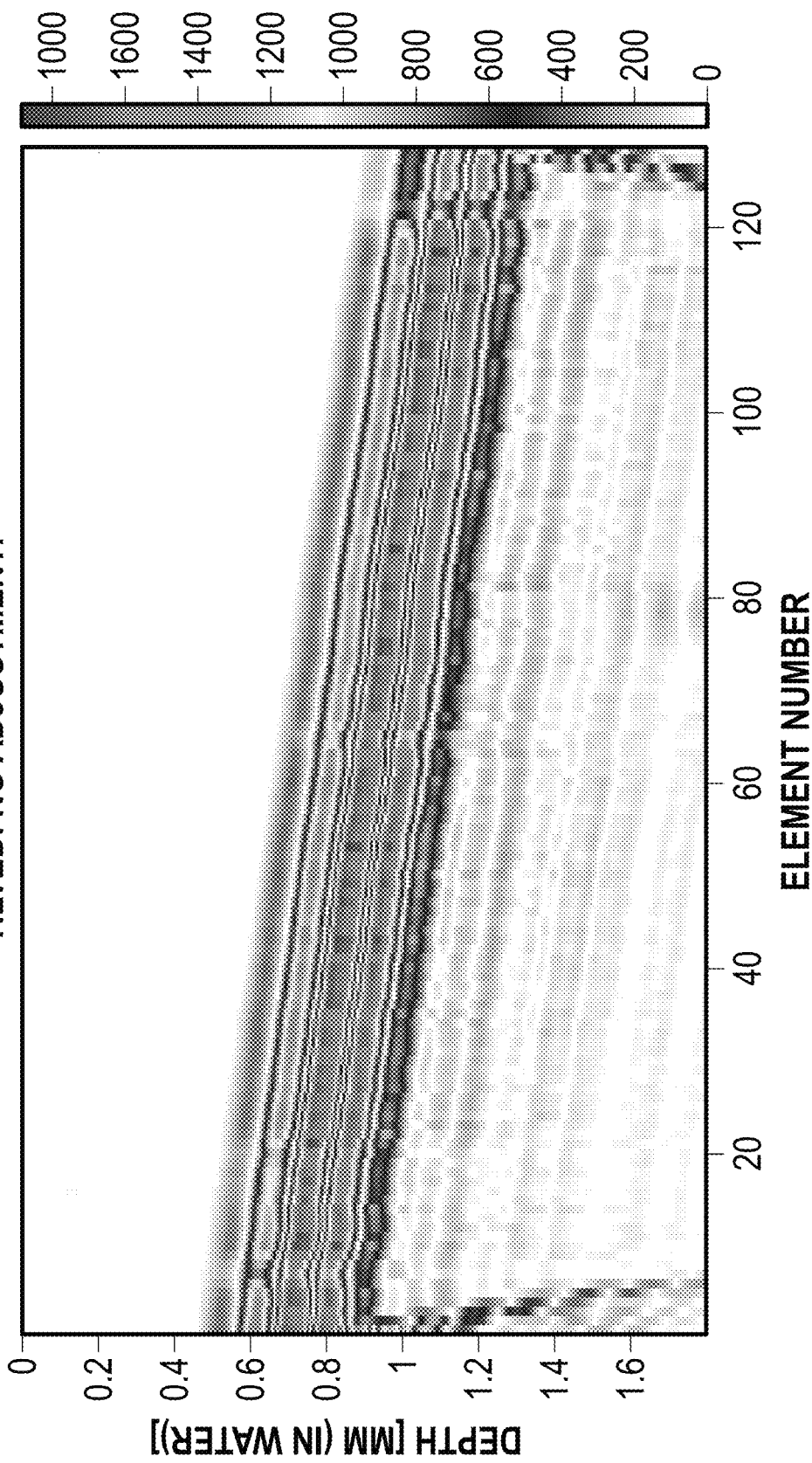
FIG. 7B shows an illustrative example of pulse-echo imaging of a surface profile (e.g., a front wall echo) for same setup as the TFM imaging of FIG. 7A.
Figure 7C:
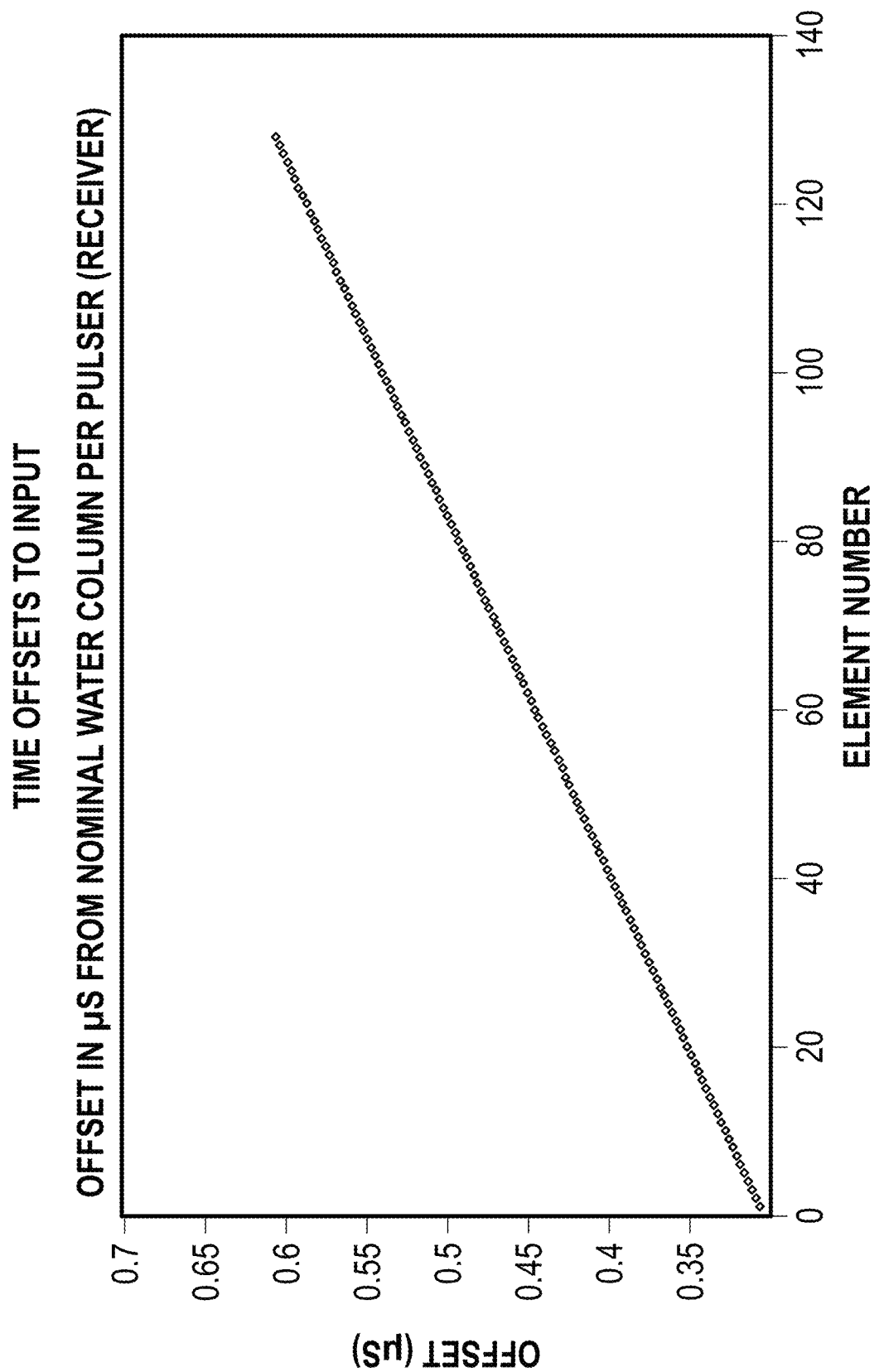
FIG. 7C shows an illustrative example of determined delay factors, such as established using the pulse-echo imaging acquisition shown in FIG. 7B, and such as can be used to perform compensation for angular offset from a nominal zero-degree orientation of the transducer array.

FIG. 7B shows an illustrative example of pulse-echo imaging of a surface profile (e.g., a front wall echo) for same setup as the TFM imaging of FIG. 7A. As in the example of FIG. 6B, above, the distinct front wall echo can be used to establish delay values as shown in FIG. 7C, shows an illustrative example of determined delay factors. As in the example of FIG. 6A where a distance offset exists relative to nominal distance, the delay values in FIG. 7C can be used to perform compensation for an angular offset from a nominal zero-degree orientation of the transducer array.

Figure 7D:
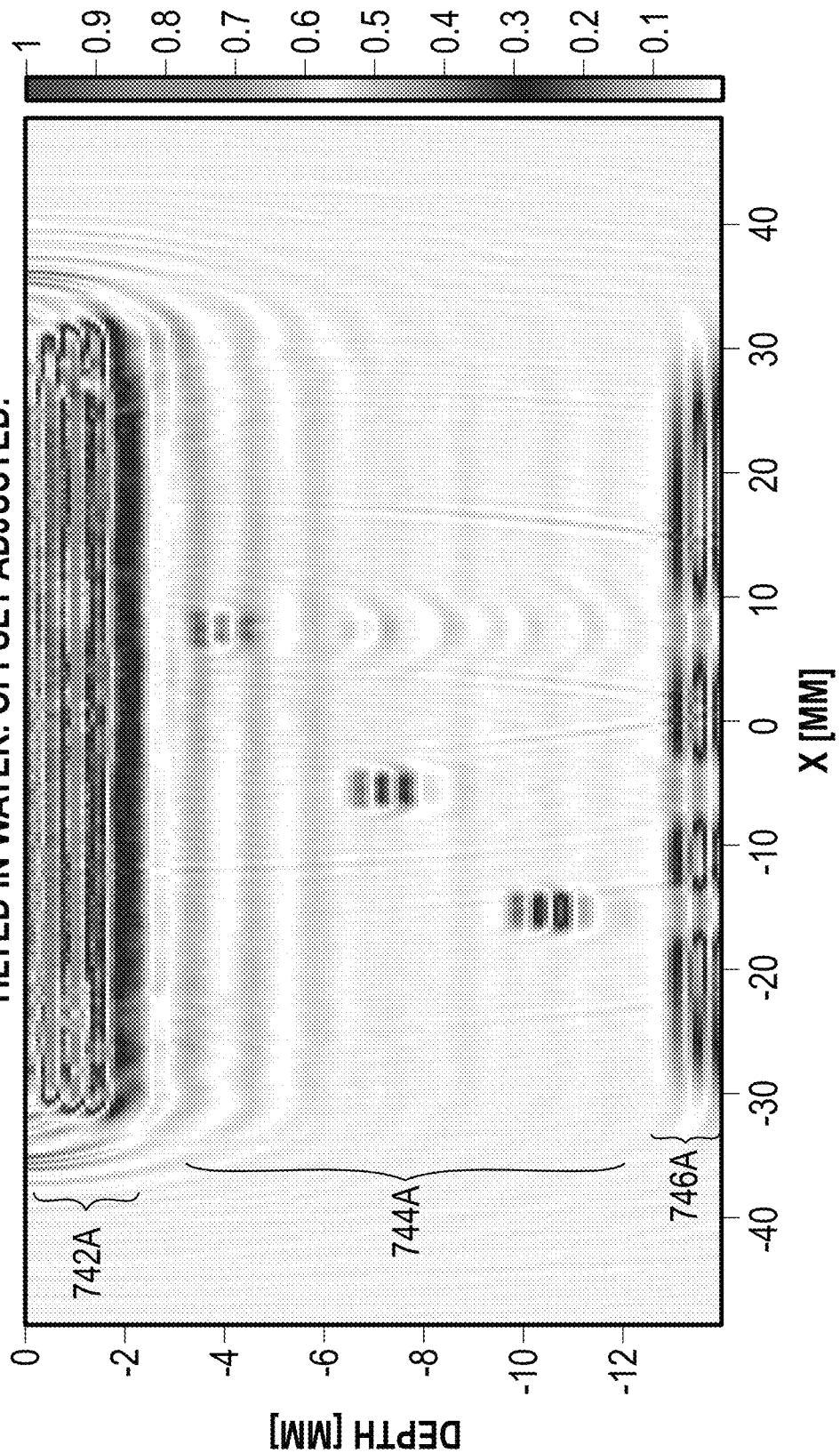
FIG. 7D shows an illustrative example of TFM imaging using angular offset adjustment, the offset adjustment performed using the determined delay factors of FIG. 7C.

FIG. 7D shows an illustrative example of TFM imaging using angular offset adjustment, the offset adjustment performed using the determined delay factors of FIG. 7C. A rendered front wall echo 742A, other features 744A (e.g., flaws or calibration structures), and a rear wall 746A appear at the appropriate depths in the compensated image shown in FIG. 7D. The examples of FIG. 6D and FIG. 7D show compensation for a distance offset and an angular offset, separately. Such examples are merely illustrative of distance offset compensation and angular offset compensation separately. The techniques described herein including delay factor determination can be used to compensate for a distance offset and angular offset contemporaneously using a single set of delay factors. Examples herein generally show a linear array, but the techniques described herein are applicable to other array geometries, such as a matrix array (e.g., a two-day matrix probe).

Figure 8:
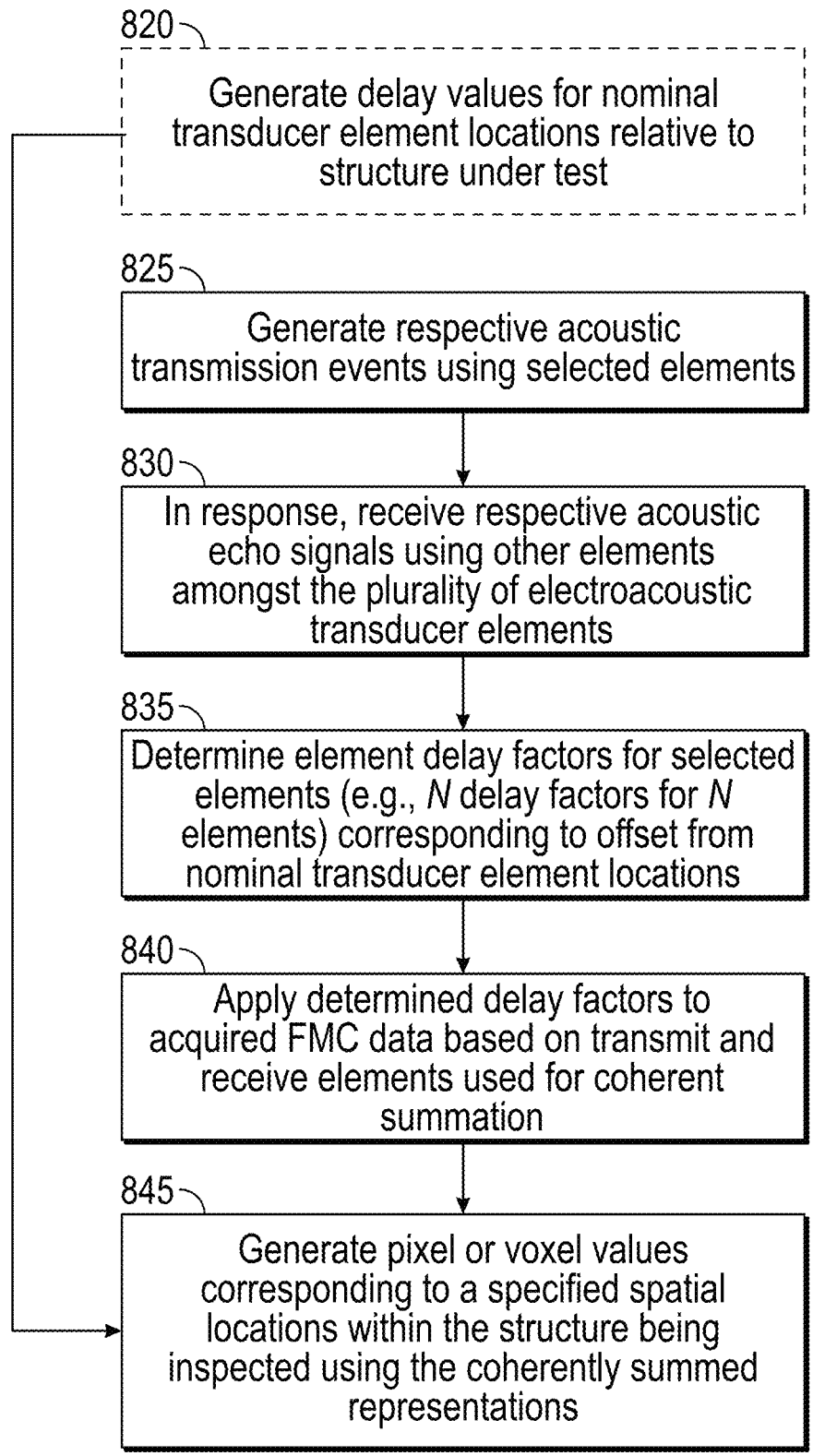
FIG. 8 shows a technique, such as a machine-implemented method, such as can be used to perform the offset adjustment in a manner similar to the illustrative examples shown in FIG. 6D or FIG. 7D.

FIG. 8 shows a technique 800, such as a machine-implemented method, such as can be used to perform the offset adjustment in a manner similar to the illustrative examples shown in FIG. 6D or FIG. 7D, and other examples herein. At 825, delay values for beamforming can be established corresponding to nominal electroacoustic transducer element locations relative to a structure under test. For example, such determination can include time-of-flight determinations for use in TFM imaging. For acquisition, at 825, respective acoustic transmission events can be generated using selected elements in an electroacoustic transducer array. In response, at 830, respective acoustic echo signals can be received using other elements amongst the plurality of electroacoustic elements, such as corresponding to an FMC acquisition. At 835, element delay factors can be determined for the selected elements, to compensate for couplant column variation from nominal distance on an element-by-element basis. For example, as discussed above, various approaches can be used to determine the element delay factors at 835, such as using pulse-echo time-of-flight determinations from a separate transmit-receive sequence or using the previously acquired acoustic echo signals at 830 (e.g., using the existing FMC data acquisition based on the nominal beamforming established at 820). Such approaches can include a spatially-limited TFM technique or a synthetic PAUT approach, as illustrative examples. An interpolation technique can be used to establish delay factors elements along an array after determining delay factors for transducers located at the edges of the array. At 840, the determined delay factors corresponding to the offset from nominal transducer element locations can be applied to FMC data to provide offset-adjusted A-scans for coherent summation in TFM imaging. This could include either establishing updated FMC data with the delay values applied to each A-scan in the updated FMC matrix, or application of delay values prior to summation using the transmit and receive element indices as A-scans are retrieved from the original FMC data, where the original FMC data was established using nominal transducer element locations. For example, at 845, pixel or voxel values are generated corresponding to specified spatial locations within the structure being inspected using coherent summation.

Figure 9:
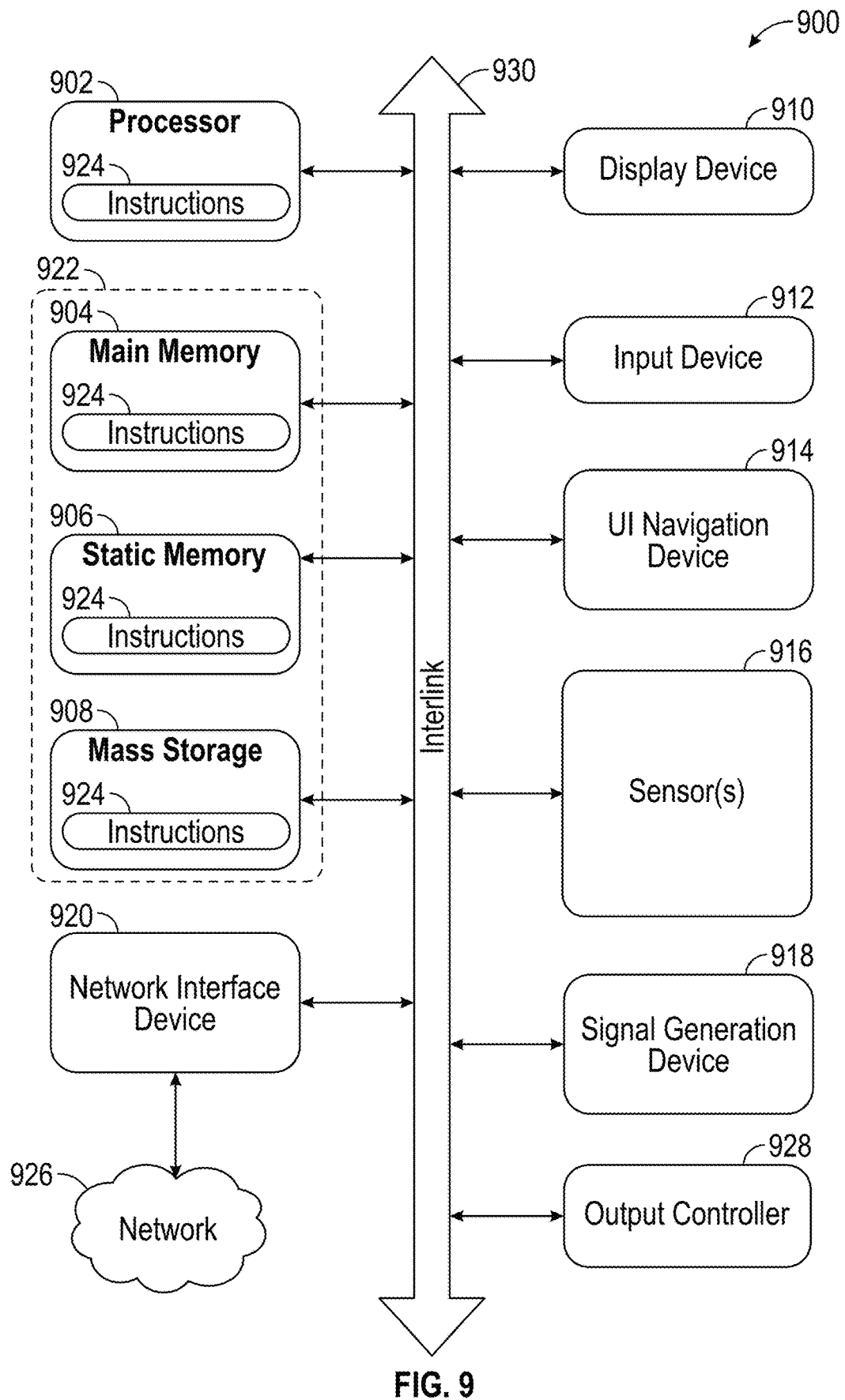
FIG. 9 illustrates a block diagram of an example comprising a machine upon which any one or more of the techniques (e.g., methodologies) discussed herein may be performed.

FIG. 9 illustrates a block diagram of an example comprising a machine 900 upon which any one or more of the techniques (e.g., methodologies) discussed herein may be performed. Machine 900 (e.g., computer system) may include a hardware processor 902 (e.g., a central processing unit (CPU), a graphics processing unit (GPU), a hardware processor core, or any combination thereof), a main memory 904 and a static memory 906, connected via an interconnect 908 (e.g., link or bus), as some or all of these components may constitute hardware for systems or related implementations discussed above.

Specific examples of main memory 904 include Random Access Memory (RAM), and semiconductor memory devices, which may include storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; or optical media such as CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912 and UI navigation device 914 may be a touch-screen display. The machine 900 may include a mass storage device 916 (e.g., drive unit), a signal generation device 918 (e.g., a speaker), a network interface device 920, and one or more sensors 930, such as a global positioning system (GPS) sensor, compass, accelerometer, or some other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the mass storage device 916 comprises a machine readable medium.

Specific examples of machine readable media include, one or more of non-volatile memory, such as semiconductor memory devices (e.g., EPROM or EEPROM) and flash memory devices; magnetic disks, such as internal hard disks and removable disks; magneto-optical disks; RAM; or optical media such as CD-ROM and DVD-ROM disks. While the machine readable medium 922 is illustrated as a single medium, the term "machine readable medium" may include a single medium or multiple media (e.g., a centralized or distributed database, or associated caches and servers) configured to store the one or more instructions 924.

An apparatus of the machine 900 includes one or more of a hardware processor 902 (e.g., a central processing unit (CPU), a graphics processing unit (GPU), a hardware processor core, or any combination thereof), a main memory 904 and a static memory 906, sensors 930, network interface device 920, antennas 932, a display device 910, an input device 912, a UI navigation device 914, a mass storage device 916, instructions 924, a signal generation device 918, or an output controller 928. The apparatus may be configured to perform one or more of the methods or operations disclosed herein.

The term "machine readable medium" includes, for example, any medium that is capable of storing, encoding, or carrying instructions for execution by the machine 900 and that cause the machine 900 to perform any one or more of the techniques of the present disclosure or causes another apparatus or system to perform any one or more of the techniques, or that is capable of storing, encoding or carrying data structures used by or associated with such instructions. Non-limiting machine-readable medium examples include solid-state memories, optical media, or magnetic media. Specific examples of machine readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); or optical media such as CD-ROM and DVD-ROM disks. In some examples, machine readable media includes non-transitory machine-readable media. In some examples, machine readable media includes machine readable media that is not a transitory propagating signal.

The instructions 924 may be transmitted or received, for example, over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example, the network interface device 920 includes one or more physical jacks (e.g., Ethernet, coaxial, or other interconnection) or one or more antennas to access the communications network 926. In an example, the network interface device 920 includes one or more antennas 932 to wirelessly communicate using at least one of single-input multiple-output (SIMO), multiple-input multiple-output (MIMO), or multiple-input single-output (MISO) techniques. In some examples, the network interface device 920 wirelessly communicates using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A machine-implemented method for acoustic evaluation of a target, the method comprising:
   generating respective acoustic transmission events using selected elements amongst a plurality of electroacoustic transducer elements and in response, receiving respective acoustic echo signals using other elements amongst the plurality of electroacoustic transducer elements;
   determining element delay factors for the selected elements, the delay factors corresponding to a deviation of a pulse-echo time of flight between a respective element and a nominal position of a surface of a structure being inspected; and
   generating and presenting an acoustic inspection image, the generating comprising, for respective pixel or voxel locations in the image:
      coherently summing representations of the respective received acoustic echo signals, the representations corresponding to respective transmit-receive pairs of elements of the plurality of electroacoustic transducers, the coherently summing including applying determined element delay factors to nominal delay values for summing the respective representations, to compensate for deviation of positions of corresponding transducer elements in the transmit-receive pairs relative to the surface of the structure being inspected; and
      generating a corresponding pixel or voxel value corresponding to a specified location in the acoustic inspection image using the coherently summed representations.

2. The machine-implemented method of claim 1, wherein determining element delay factors for selected elements of the plurality of electroacoustic transducers includes determining delay factors corresponding to respective elements at or near an edge of an array, and interpolating delay factors for other elements based on the determined delay factors corresponding to respective elements at or near the edge of the array.

3. The machine-implemented method of claim 2, wherein the determining the delay factors corresponding to the respective elements at or near the edge of the array comprises coherently summing representations of the received acoustic echo signals to approximate a beam normal to a nominal shape of the surface of the structure being inspected, the beam formed using a plurality of transducers at or near the edge of the array.

4. The machine-implemented method of claim 1, wherein the representations of the respective received acoustic echo signals comprise A-scan representations.

5. The machine-implemented method of claim 4, wherein the generating the respective acoustic transmission events using the selected elements and in response, receiving the respective acoustic echo signals using other elements amongst the plurality of electroacoustic transducer elements comprises performing a full-matrix capture (FMC) acquisition; and
   wherein coherently summing and generating the pixel or voxel value comprises performing a total focusing method (TFM) technique.

6. The machine-implemented method of claim 5, wherein a nominal time-of-flight duration determination is made for establishing an initial FMC matrix, the nominal time-of-flight duration established using a nominal shape of the surface of the structure being inspected, and a nominal position of the electroacoustic transducers relative to the surface of the structure being inspected; and
   wherein the applying the determined element delay factors comprises modifying the nominal time-of-flight determinations with delay factors representing offsets associated with a corresponding transmit element and a corresponding receive element used for acquiring each time series in the respective FMC matrix.

7. The machine-implemented method of claim 5, wherein the applying the determined element delay factors comprises establishing an updated FMC matrix by adjusting a time offset or phase value applied to a respective time series corresponding to a respective FMC matrix element based on determined delay factors of a corresponding transmit element and a corresponding receive element used for acquiring a respective time-series.

8. The machine-implemented method of claim 1, wherein applying determined element delay factors to the respective representations comprises adjusting a time offset or phase value applied to a respective representation based on determined delay factors of a corresponding transmit element and the corresponding receive element used for acquiring the respective representation.

9. The machine-implemented method of claim 1, wherein the plurality of electroacoustic transducer elements comprises a count of N elements, and wherein the determined element delay factors comprise a count of N delay factors, with a delay factor corresponding to each element.

10. The machine-implemented method of claim 1, wherein the determined element delay factors are used to compensate for variation of a distance of respective transmitting and receiving elements from the surface of the structure being inspected, as compared to a nominal distance used for beamforming determinations.

11. The machine-implemented method of claim 1, wherein the determined element delay factors are used to compensate for variation of an angle of an array comprising respective transmitting and receiving elements to the surface of the structure being inspected, as compared to a nominal angle used for beamforming determinations.

12. The machine-implemented method of claim 1, comprising displaying a representation of generated pixel or voxel values corresponding to a region of the structure insonified using the respective transmission events and received acoustic echo signals.

13. An ultrasonic inspection system, comprising:
an analog front end comprising transmit and receive circuitry coupled to a plurality of electroacoustic transducer elements;
a processor circuit communicatively coupled with the analog front end; and
a memory circuit comprising instructions that, when executed by the processor circuit, cause the system to:
generate respective acoustic transmission events using selected elements amongst a plurality of electroacoustic transducer elements and in response, receiving respective acoustic echo signals using other elements amongst the plurality of electroacoustic transducer elements;
determine element delay factors for the selected elements, the delay factors corresponding to a deviation of a pulse-echo time of flight between a respective element and a nominal position of a surface of a structure being inspected; and
generate and present an acoustic inspection image, the generating comprising, for respective pixel or voxel locations in the image, instructions to:
coherently sum representations of the respective received acoustic echo signals, the representations corresponding to respective transmit-receive pairs of elements of the plurality of electroacoustic transducers, the coherently summing including applying determined element delay factors to nominal delay values for summing the respective representations, to compensate for deviation of positions of corresponding transducer elements in the transmit-receive pairs relative to the surface of the structure being inspected; and
generate a corresponding pixel or voxel value corresponding to a specified location in the acoustic inspection image using the coherently summed representations.

14. The system of claim 13, wherein the instructions to determine element delay factors for selected elements of the plurality of electroacoustic transducers include instructions determine delay factors corresponding to respective elements at or near an edge of an array, and interpolating delay factors for other elements based on the determined delay factors corresponding to respective elements at or near the edge of the array.

15. The system of claim 13, wherein the instructions to generate the respective acoustic transmission events using the selected elements and in response, receive the respective acoustic echo signals using other elements amongst the plurality of electroacoustic transducer elements comprises performing a full-matrix capture (FMC) acquisition; and
wherein the instructions to coherently sum and generate the pixel or voxel value comprises performing a total focusing method (TFM) technique.

16. The system of claim 15, wherein the instructions comprise determining a nominal time-of-flight duration for establishing an initial FMC matrix, the nominal time-of-flight duration established using a nominal shape of the surface of the structure being inspected, and a nominal position of the electroacoustic transducers relative to the surface of the structure being inspected; and
wherein the instructions to apply the determined element delay factors comprise instructions to modify the nominal time-of-flight determinations with delay factors representing offsets associated with a corresponding transmit element and a corresponding receive element used for acquiring each time series in the respective FMC matrix.

17. The system of claim 13, wherein the instructions to apply determined element delay factors to the respective representations comprise instructions to adjust a time offset or phase value applied to a respective representation based on determined delay factor of the corresponding receive element used for acquiring the respective representation, the time offset or the phase value corresponding to a pulse and echo having normal incidence to the surface of the structure being inspected.

18. The system of claim 13, wherein the instructions comprise using the determined element delay factors to compensate for variation of a distance of respective transmitting and receiving elements from the surface of the structure being inspected, as compared to a nominal distance used for beamforming determinations, or for variation of an angle of an array comprising the respective transmitting and receiving elements to the surface of the structure being inspected, as compared to a nominal angle used for beamforming determinations, or for variation in both the distance and the angle.

19. The system of claim 18, wherein the distance comprises a liquid column height.

20. The system of claim 13, comprising a display; and
wherein the instructions comprise instructions to present, using the display, the acoustic inspection image.

* * * * *